United States Patent
Gulker et al.

(10) Patent No.: US 10,259,505 B2
(45) Date of Patent: Apr. 16, 2019

(54) ACTIVE VEHICLE PILLAR ARRANGEMENT FOR SELECTIVE WIND NOISE, WIND THROB, SNOW BUILDUP AND MOISTURE CONTROL

(71) Applicant: FORD GLOBAL TECHNOLOGIES, LLC, Dearborn, MI (US)

(72) Inventors: William S Gulker, Beverly Hills, MI (US); Jonathan B Barnes, Troy, MI (US); Travis S Garland, Milford, MI (US); Mark George Vojtisek, Royal Oak, MI (US); Jamal Kanso, Grosse Ile, MI (US); Douglas Richard Olson, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 157 days.

(21) Appl. No.: 15/251,386

(22) Filed: Aug. 30, 2016

(65) Prior Publication Data

US 2018/0057065 A1    Mar. 1, 2018

(51) Int. Cl.
*B60J 10/242* (2016.01)
*B60J 10/25* (2016.01)
(Continued)

(52) U.S. Cl.
CPC .............. *B62D 25/04* (2013.01); *B60J 1/02* (2013.01); *B60R 13/04* (2013.01); *B60R 13/07* (2013.01)

(58) Field of Classification Search
CPC . B60J 10/242; B60J 10/25; B60J 10/27; B60J 10/45; B60J 10/70; B60J 10/72;
(Continued)

(56) References Cited

U.S. PATENT DOCUMENTS 5,118,157 A * 6/1992 Tamura ................. B60J 1/2002
                                                                    296/180.5
7,641,275 B2    1/2010 Campbell et al.
(Continued)

FOREIGN PATENT DOCUMENTS

DE    102012221993 A1    6/2014
JP    04185528 A    7/1992
(Continued)

OTHER PUBLICATIONS

English Machine Translation of DE102012221993A1.
(Continued)

*Primary Examiner* — Hilary L Gutman
(74) *Attorney, Agent, or Firm* — Jason Rogers; Vichit Chea; King & Schickli, PLLC

(57) ABSTRACT

An apparatus is for use with a pillar adjacent to a vehicle window, such as a windshield. The apparatus includes a molding for positioning adjacent to the pillar, the molding forming a channel in a deployed condition for receiving moisture from the vehicle windshield, or for reducing the effects of wind throb when a single vehicle window is open. An actuator may be associated with the molding for activating a non-deployed condition of the molding for reducing the effects of wind noise. The molding may include a passage for receiving an airflow and transmitting it to an outlet for directing fluid away from the molding, the pillar and adjacent side window. In the deployed condition, the molding may project from a surface of the pillar and in the non-deployed condition may be substantially flush with the surface of the pillar.

12 Claims, 14 Drawing Sheets

(51) Int. Cl.
  *B62D 25/04* (2006.01)
  *B60J 1/02* (2006.01)
  *B60R 13/04* (2006.01)
  *B60R 13/07* (2006.01)

(58) Field of Classification Search
  CPC ...... B60J 10/77; B60J 10/777; B60J 10/7775; B60R 13/06; B60R 13/07
  See application file for complete search history.

(56) References Cited

U.S. PATENT DOCUMENTS

| | | | | |
|---|---|---|---|---|
| 2007/0267891 | A1* | 11/2007 | Grudzinski | B62D 35/00 296/180.1 |
| 2009/0017743 | A1* | 1/2009 | Raghuprasad | B60S 1/54 454/123 |
| 2010/0320796 | A1* | 12/2010 | Hoefer | B60R 13/07 296/93 |
| 2012/0104800 | A1* | 5/2012 | Dimitriou | B62D 25/04 296/193.06 |
| 2016/0129771 | A1* | 5/2016 | Nakai | B60J 1/02 296/93 |
| 2016/0178060 | A1* | 6/2016 | Newhouse | F16J 15/16 277/345 |
| 2018/0037175 | A1* | 2/2018 | Tsutsumi | B60J 1/02 |
| 2018/0056766 | A1* | 3/2018 | Vojtisek | B60J 10/50 |

FOREIGN PATENT DOCUMENTS

| | | |
|---|---|---|
| JP | 06156075 A | 6/1994 |
| JP | 10114258 A * | 5/1998 |
| KR | 101324324 B1 | 11/2013 |
| KR | 20140029802 A | 3/2014 |

OTHER PUBLICATIONS

English Machine Translation of JPH04185528A.
English Machine Translation of JPH06156075A.
English Machine Translation of KR101324324B1.
English Machine Translation of KR20140029802A.
Office Action dated Apr. 12, 2018 for U.S. Appl. No. 15/251,303, filed Aug. 30, 2016.

* cited by examiner

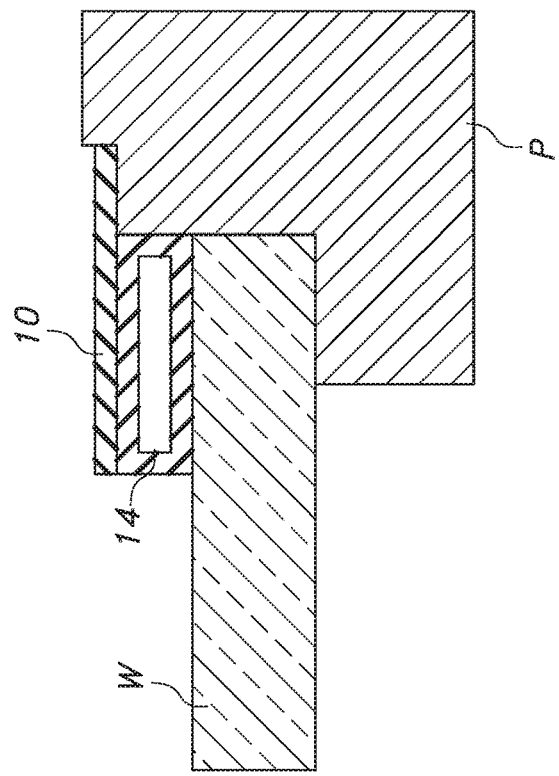
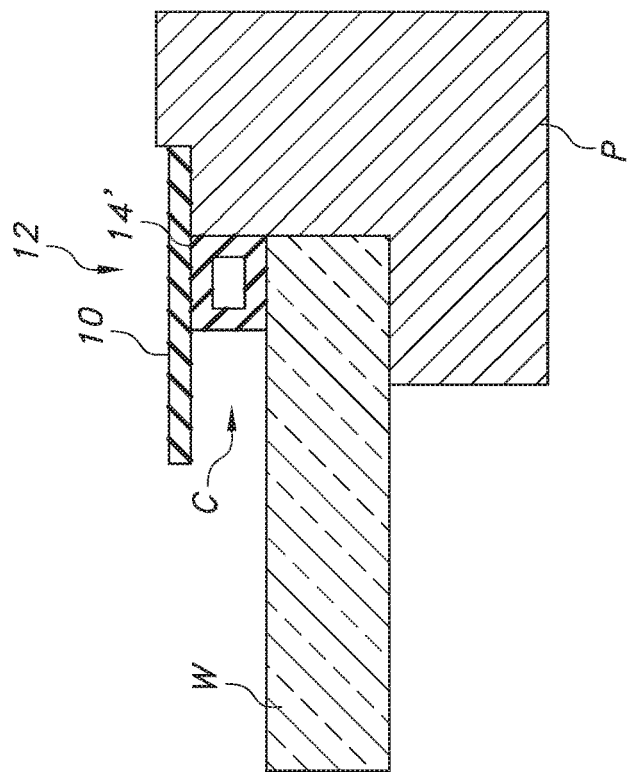
FIG. 9
FIG. 8

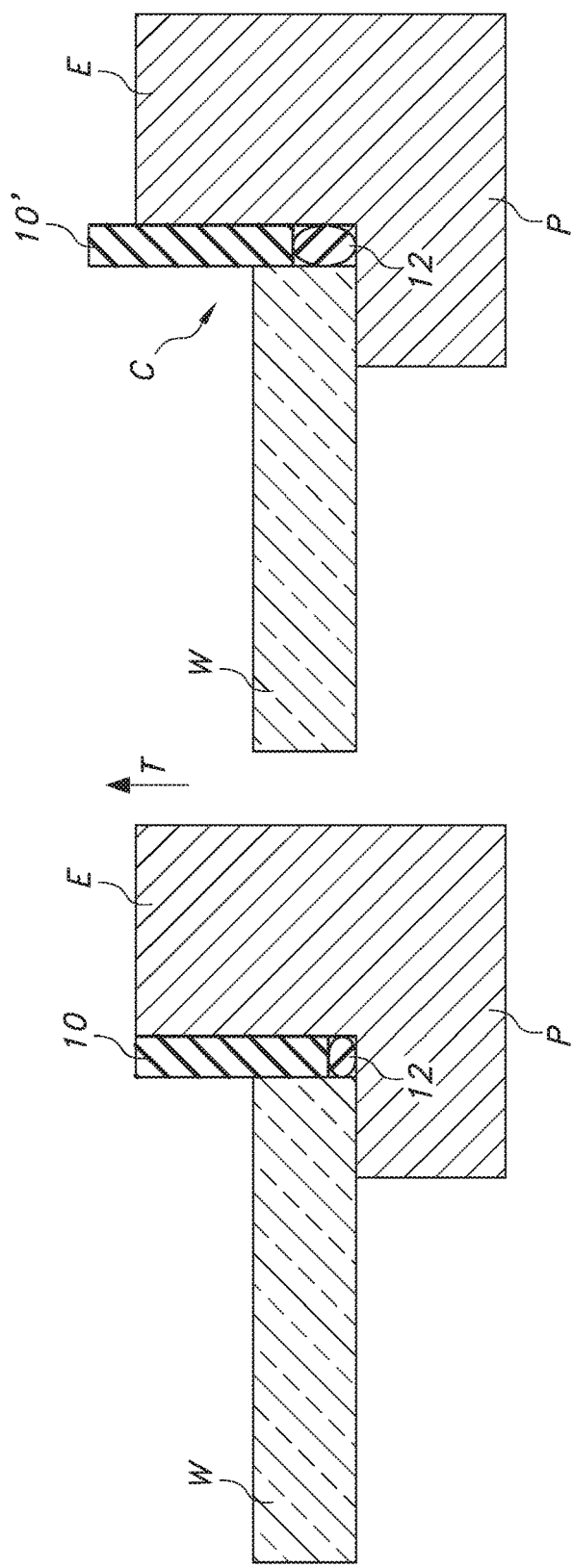

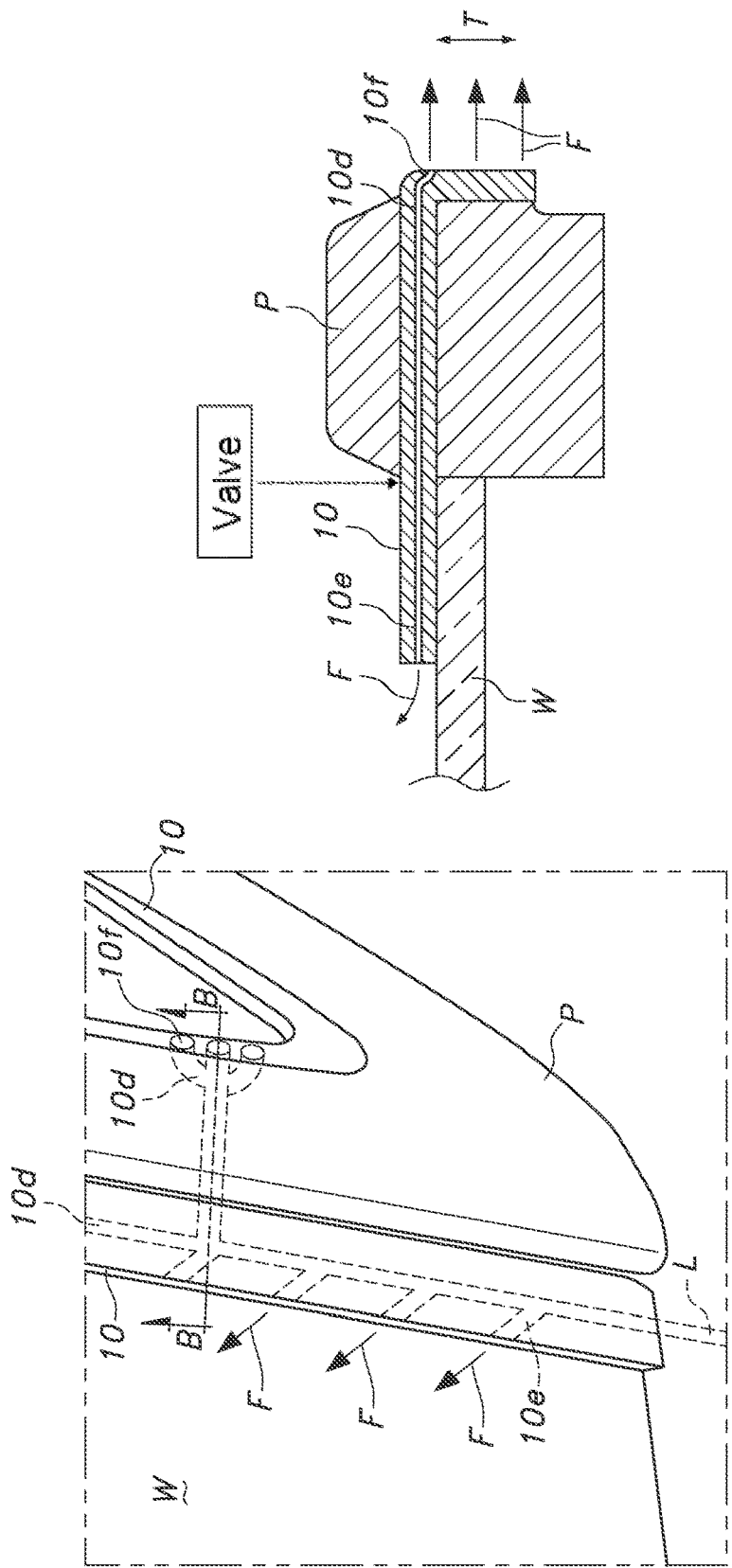

ACTIVE VEHICLE PILLAR ARRANGEMENT FOR SELECTIVE WIND NOISE, WIND THROB, SNOW BUILDUP AND MOISTURE CONTROL

TECHNICAL FIELD

This document relates generally to the motor vehicle field and, more particularly, to an active pillar in a vehicle to selectively provide for wind noise, wind throb, snow buildup, or moisture control depending on driving conditions or driver preferences.

BACKGROUND

The design of vehicle front pillars, or "A" pillars, for supporting the windshield is typically done to provide for a measure of moisture control. For instance, it may be desirable to ensure that moisture pushed toward the pillar by the windshield wipers is prevented from collecting or reverting back to the viewable portion of the windshield or otherwise properly channeled away. This may be achieved through the strategic design and placement of a covering, such as a molding, in the space between the pillar and the windshield.

While past approaches in this regard may be effective for adequate moisture control, the arrangements involve complex geometries and may lead to an increase in the resulting wind noise, especially at high speeds. Accounting for the wind noise by attempting to reduce the profile in a permanent fashion may compromise the effectiveness of the covering in terms of moisture control. Likewise, providing a fixed channel for moisture control may result in the undesirable build-up of snow as a result of being pushed toward the pillar by the windshield wipers and collecting in the fixed channel, which essentially forms an impediment. Airflow parallel to the vehicle direction of travel when one window is down may also cause excessive wind vibration, also known as wind throb, which it is desirable to avoid to the greatest extent possible.

Thus, a need is identified for a vehicle pillar arrangement adaptable to different conditions encountered during vehicle use, either automatically as a result of sensed conditions or as a result of driver preferences. For instance, the pillar should be able to handle moisture when present, yet be adaptable to reduce wind noise, wind throb or help to prevent snow (or ice) buildup when present while driving. The arrangement would be easy and relatively inexpensive to implement on existing vehicle designs without significant modification, thus potentially allowing for a retrofit application.

SUMMARY

In accordance with the purposes and benefits described herein, an apparatus is for use in connection with a pillar for supporting a vehicle windshield. The apparatus comprises a molding for positioning in a space adjacent the pillar. The molding includes a passage for receiving an airflow, the passage communicating with one or more outlets in the molding for transmitting the airflow in a direction for directing fluid away from the molding.

In one embodiment, the outlets are oriented for directing the airflow toward the windshield of the vehicle to keep moisture away from the pillar, such as by directing the airflow in a vertical direction (e.g., toward the roof of the vehicle associated with the upper portion of the windshield). In another embodiment, the outlets are oriented for directing airflow transverse to a direction of vehicle travel. The outlets may also be adjacent to the windshield, on a door of the vehicle adjacent to a window to reduce the effects of wind throb, or both. An actuator, such as a valve, may also be provided for controlling the airflow.

Yet another aspect of the disclosure pertains to an apparatus for use in connection with a windshield of a motor vehicle. The apparatus comprises a pillar for supporting the windshield, the pillar including a surface exposed to wind during the movement of the vehicle. A molding is provided having a deployed condition projecting away from the surface of the pillar for guiding moisture away from the pillar and a non-deployed or withdrawn condition, such that it does not project from and may be substantially flush with the surface of the pillar for reducing the effects of wind noise.

An actuator may be provided for activating the molding, such as by moving it to and fro in a direction of vehicle travel. In a case where the molding is mounted for linear movement, the actuator comprises a linear actuator, but it may also comprise a rotary actuator or an inflatable bladder for causing the activation. The molding may comprise a body including a projection for projecting from the surface of the pillar in the deployed condition. The molding may take a variety of shapes, and may have a C-shaped cross-section. The pillar may also include a recess for receiving the molding in the non-deployed condition.

In the following description, several embodiments of the active pillar arrangement are shown and described. As it should be realized, the arrangement is capable of other, different embodiments and its several details are capable of modification in various, obvious aspects all without departing from the active pillar arrangement as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the active pillar arrangement and together with the description serve to explain certain principles thereof. In the drawing figures:

FIGS. 8 and 9 are schematic top down views of an active pillar arrangement in a deployed and non-deployed configuration according to another aspect of the disclosure;

FIGS. 12 and 13 are schematic top down views of an active pillar arrangement in a non-deployed and deployed configuration according to another aspect of the disclosure;

FIGS. 18 and 19 are cutaway perspective and cross-sectional views of an active pillar arrangement according to yet another aspect of the disclosure;

Figure 20:
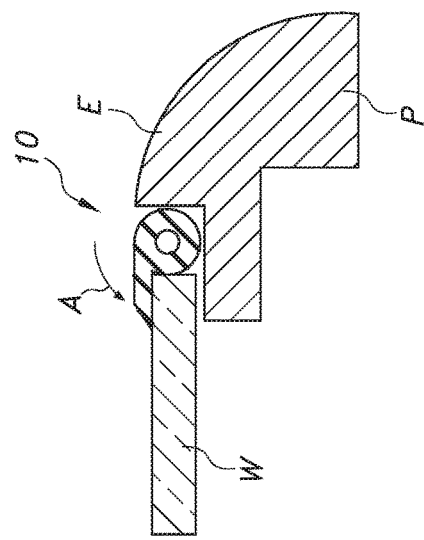
Figure 21:
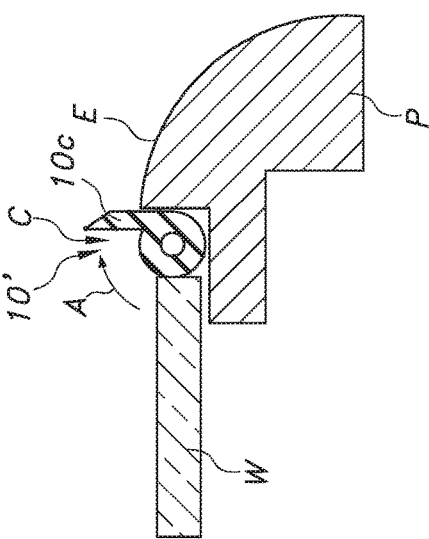
Figure 21A:
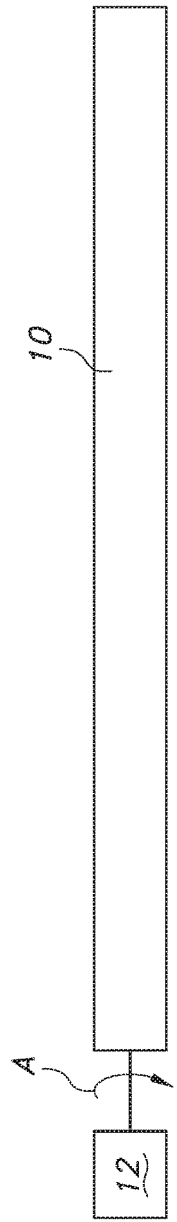
Figure 22:
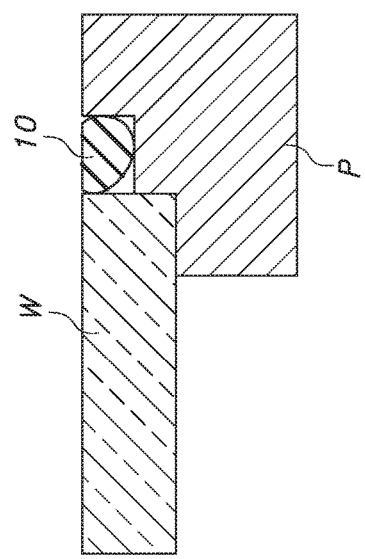
Figure 23:
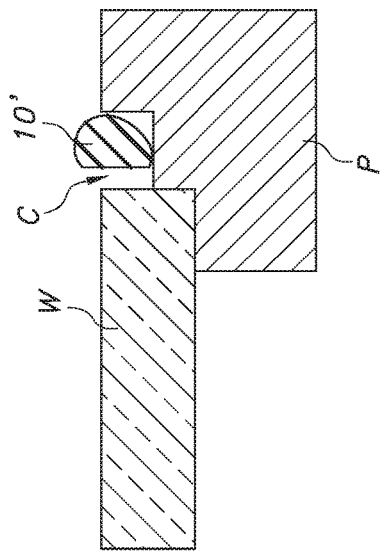
Figure 24:
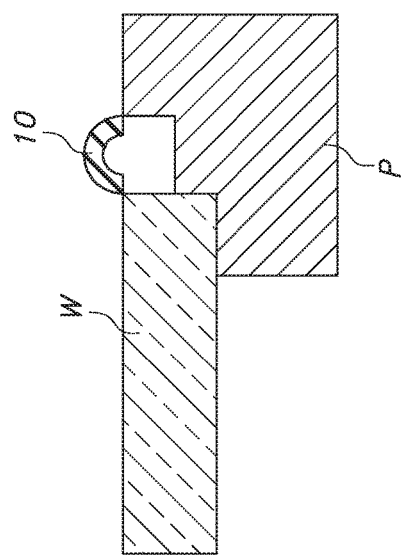
Figure 25:
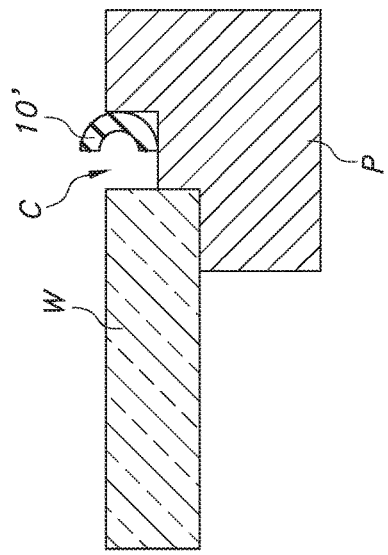
Figure 27:
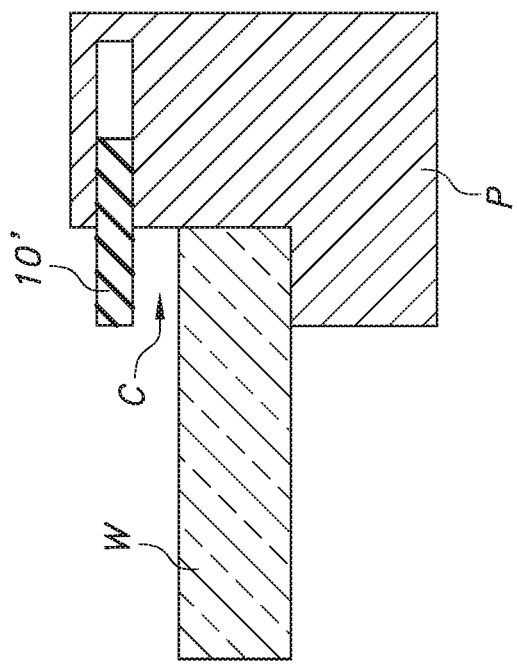
Figure 26:
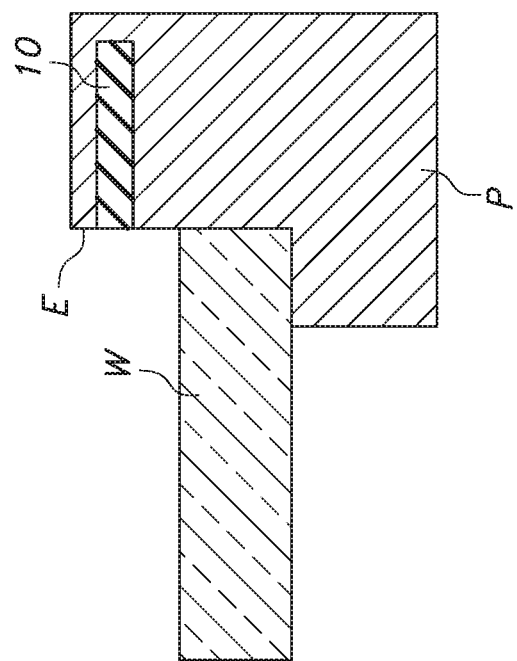
Figure 28:
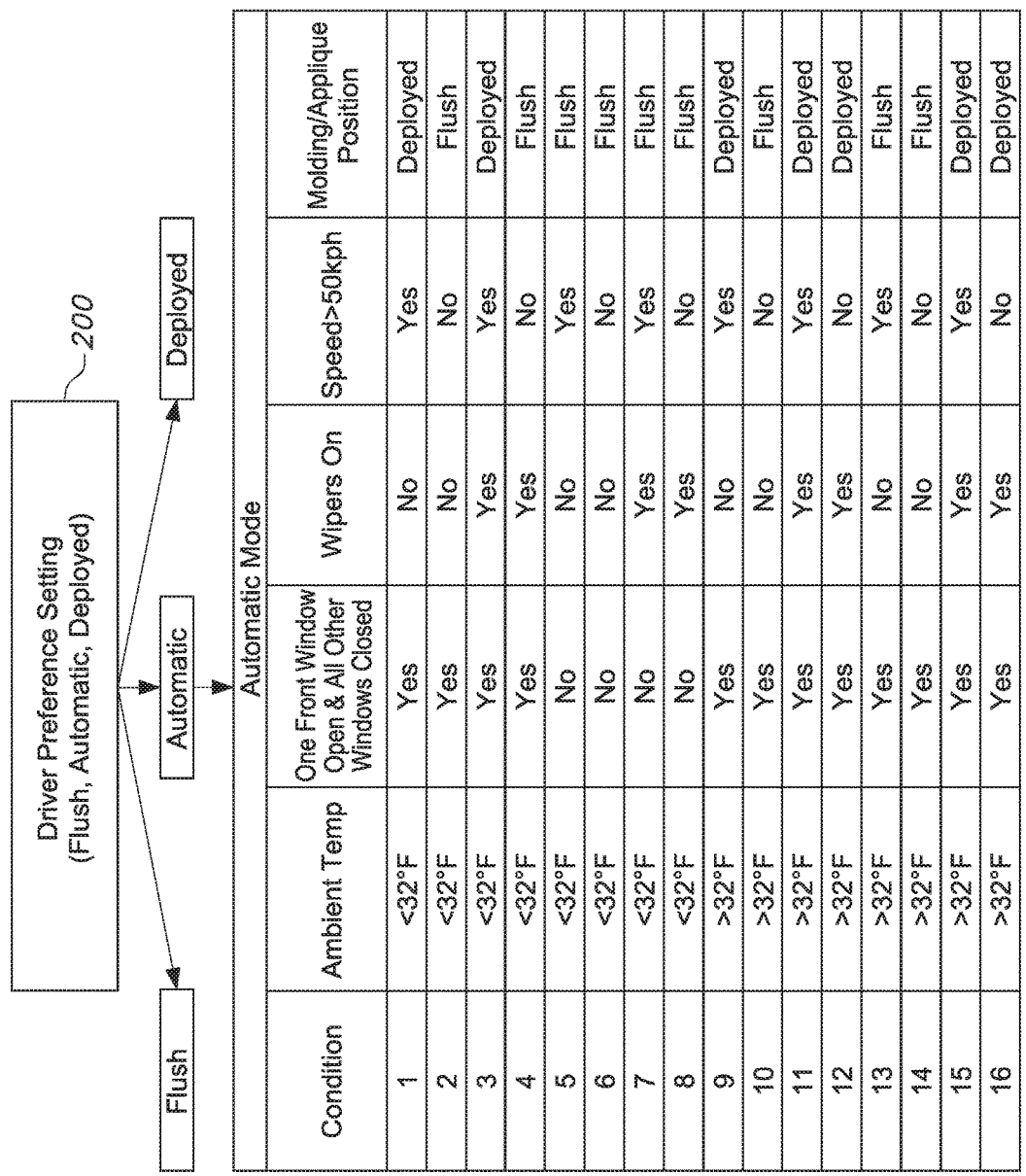

FIGS. 20, 21, and 21a are schematic top down and side views of an active pillar arrangement in a deployed and non-deployed configuration according to another aspect of the disclosure;

FIGS. 22 and 23 are schematic top down views of an active pillar arrangement in a non-deployed and deployed configuration according to another aspect of the disclosure;

FIGS. 24 and 25 are schematic top down views of an active pillar arrangement in a non-deployed and deployed configuration according to another aspect of the disclosure;

FIGS. 26 and 27 are schematic top down views of an active pillar arrangement in a non-deployed and deployed configuration according to another aspect of the disclosure; and FIG. 28 is a schematic view including a table illustrating possible operational conditions for the active pillar arrangement.

Reference will now be made in detail to the present preferred embodiments of the active pillar arrangement, examples of which are illustrated in the accompanying drawing figures.

DETAILED DESCRIPTION

Figure 1:
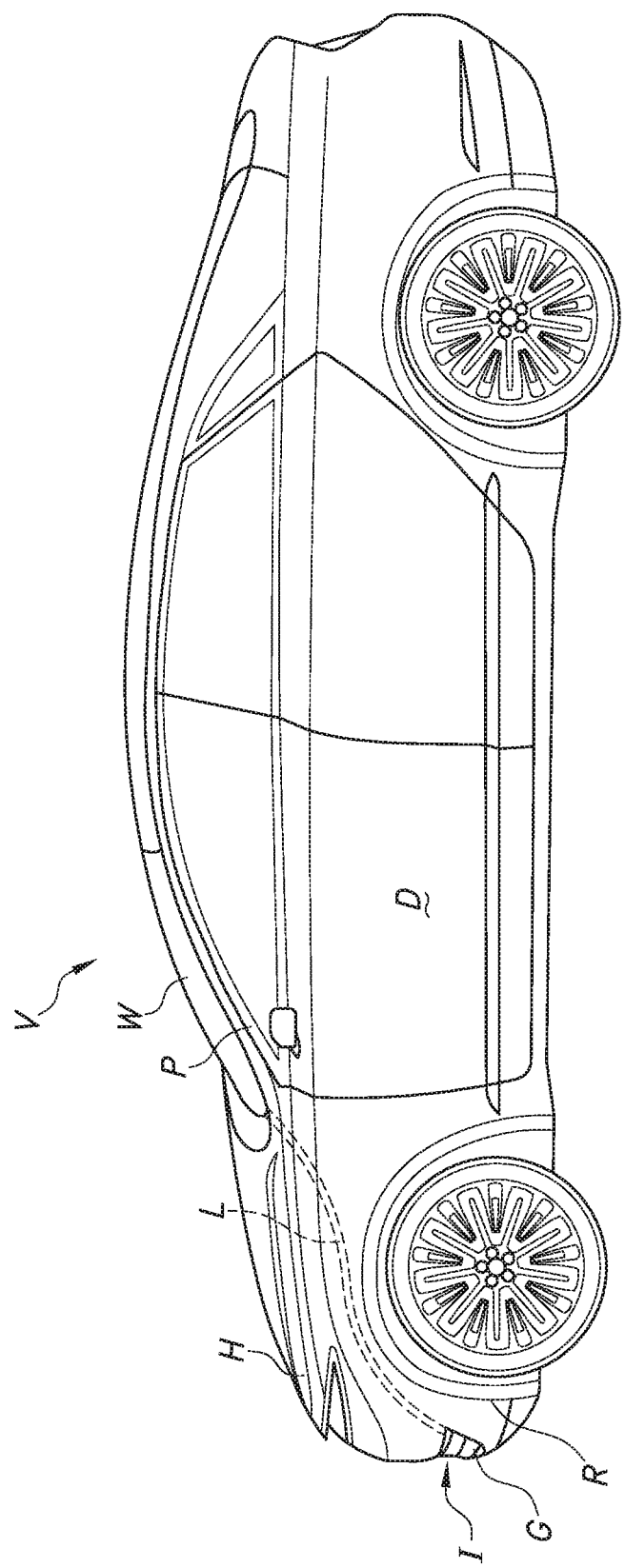
FIG. 1 is a side view of a vehicle in the form of a passenger car that may benefit from aspects of the disclosure.
Figure 3:
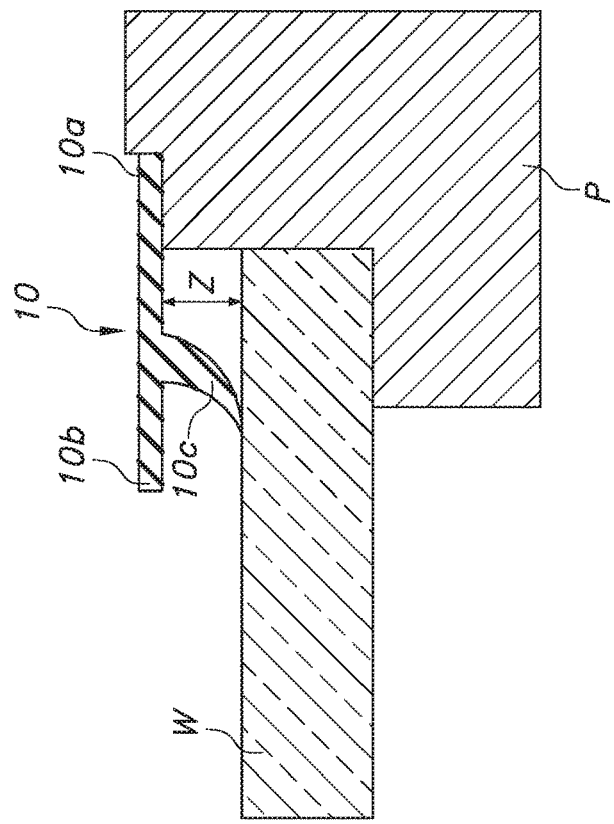
FIG. 3 is a schematic top down view of a pillar arrangement according to the disclosure.
Figure 2:
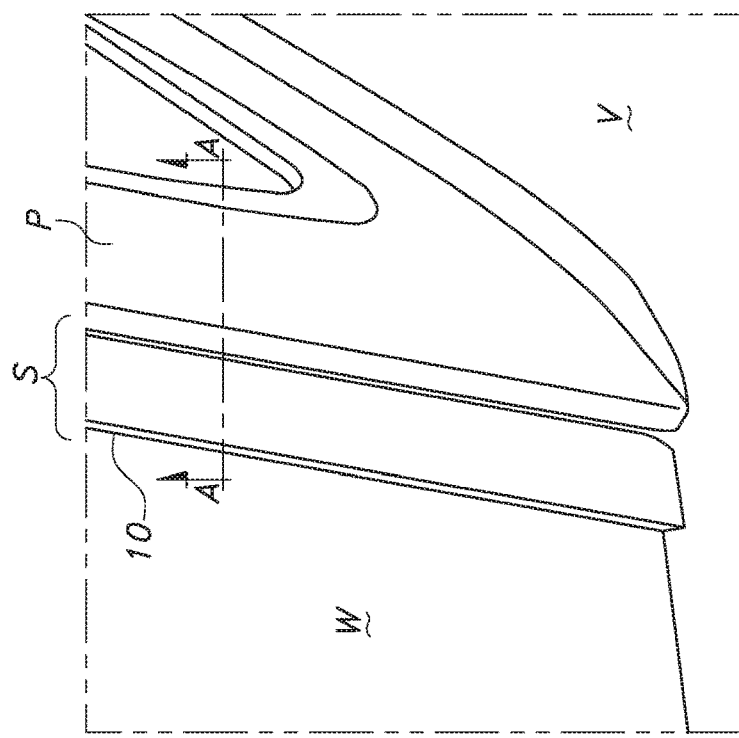
FIG. 2 is an enlarged, partially cutaway view of a portion of the vehicle including a pillar for supporting the windshield and an associated molding.

Reference is now made to FIGS. 1, 2, and 3, which illustrate a vehicle V including a windshield W supported at one side by a pillar P forming part of the vehicle. In the illustrated embodiment, a covering, which may be in the form of a molding 10 is provided for positioning in a gap or space S between the windshield W and the pillar P, on the opposite side of which is a frame of the vehicle front door D. As indicated in FIG. 3, which is a schematic cross section along line A-A of FIG. 2, the molding 10 may connect at one end 10a to the pillar P, and extend over the windshield W at an opposite or free end 10b (but as can be appreciated, it could also be used in connection with windows on other parts of the vehicle, such as the door D).

In some cases, as shown in FIG. 3, this opposite end 10b may be spaced from the windshield W a distance Z, which may vary along the height of the windshield in view of the sloping, curved, or angled nature of the pillar P and windshield in the typical arrangement. In such case, the molding 10 may include a depending portion 10c or lip that forms a seal with the windshield W and, together with the free end 10b, may under certain conditions as the result of active control create a channel C for receiving and guiding, or channeling, fluid collected therein away from the exposed surface of the windshield W (such as the result of the slope and wind forces encountered during driving of the vehicle V).

Figure 4:
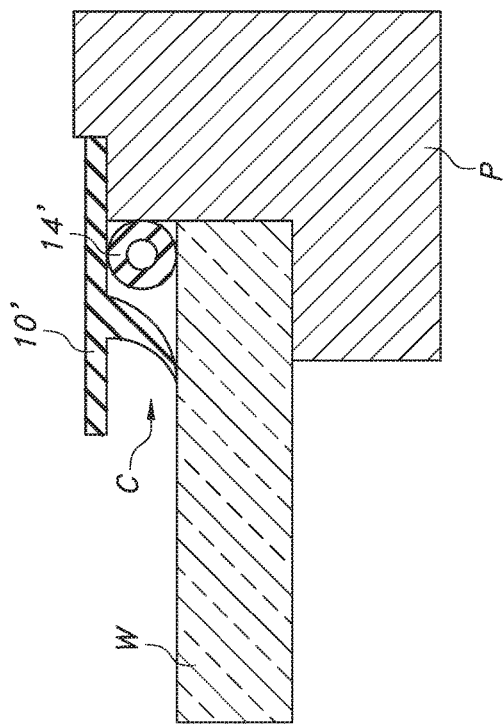
FIGS. 4 and 5 are schematic top down views of an active pillar arrangement in a non-deployed and deployed configuration according to one aspect of the disclosure.

According to one aspect of the disclosure, the molding 10 may be used to make the associated pillar P active in order to provide for an enhanced level of moisture control and to reduce the effects of wind noise depending on the conditions encountered. In the example shown in FIG. 4, which is a schematic cross-section taken along line A-A in FIG. 2, the activation may be provided by an actuator 12 (see also FIG. 5a) that is flexible and arranged for causing movement of the molding 10 between a deployed and non-deployed condition. In FIG. 4, the flexible actuator 12 takes the form of an inflatable bladder 14 positioned in the gap or space between the molding 10 and the pillar P. Thus, as indicated, when the bladder 14 is deflated, the molding 10 as a result of inherent material properties may assume a collapsed or relaxed state, presenting a rounded or other aerodynamic shape along a forward face thereof. This tends to reduce the noise from wind being encountered and allows for the release of snow or ice build-up on the adjacent windshield W.

Figure 5:
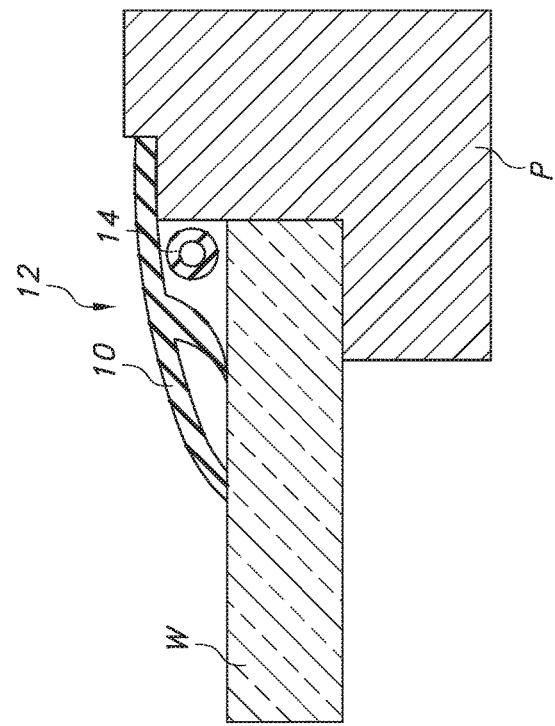

When meaningful or excessive moisture is present such that control is warranted, an associated pump 17 may cause the bladder 14 to inflate (pneumatically or hydraulically), as indicated in FIG. 5. The resulting force acting on the molding 10 causes it to change the shape and/or position to be less favorable to low noise levels from wind, but better adapted for dealing with the presence of moisture (such as, for example, by causing the molding 10 to move away from the windshield W and expose channel C for receiving and conveying away moisture). In this configuration, the molding 10 may also be better able to reduce the incidence of wind throb when one of the vehicle windows is open.

Figure 5A:
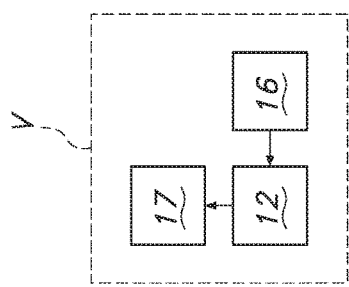
FIG. 5a is a schematic view illustrating an arrangement for actuating the active pillar.

As indicated in FIG. 5a, the presence of moisture may be detected automatically using a sensor 16 associated with the actuator 12 for controlling pump 17. The sensor 16 may be adapted for sensing moisture, providing an indication of temperature (to differentiate between rain and snow), sensing a vehicle condition (such as speed or whether the windows are down), a combination of any of the foregoing, other parameters relevant to the decision whether to activate the pillar to change configurations. For instance, control of the bladder 14 may also be as a result of the windshield wipers being activated, thus indicating the presence of rain, or otherwise as indicated by the vehicle operator based on an encountered or desired condition.

Figure 7:
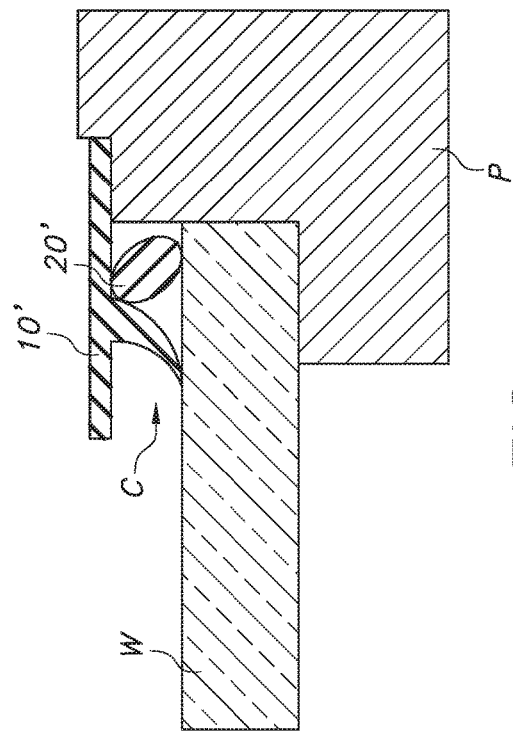
FIGS. 6 and 7 are schematic top down views of an active pillar arrangement in a non-deployed and deployed configuration according to another aspect of the disclosure.
Figure 6:
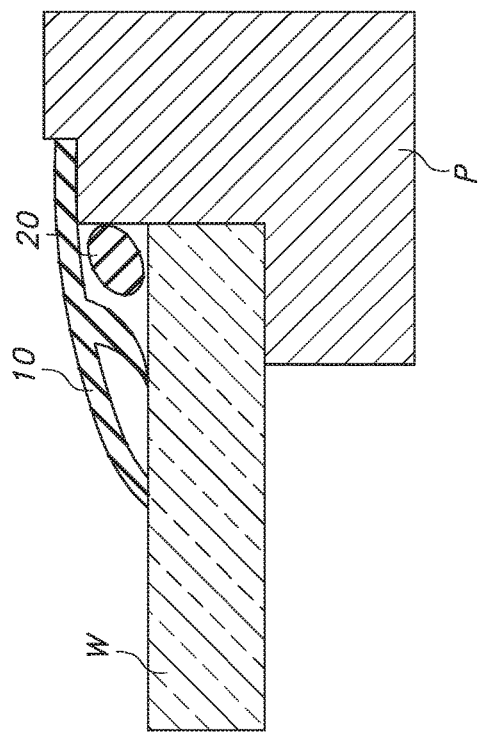

With reference to FIGS. 6 and 7, the actuator 12 may also take the form of a rotatable structure, such as a cam 20, which may be arranged for selectively engaging the molding 10 to cause the same movement as described previously. Specifically, the cam 20 may be adapted for engaging the molding 10 in one position (FIG. 7), and disengaging it in a second position (FIG. 6). In the illustrated embodiment, the cam 20 is an oblong or egg-shaped structure in cross-section (but could take other forms). The cam 20 may be connected to a motive device, such as a rotary motor 18, for causing it to move or rotate within the space between the molding 10, pillar P, and windshield W.

Figure 7A:
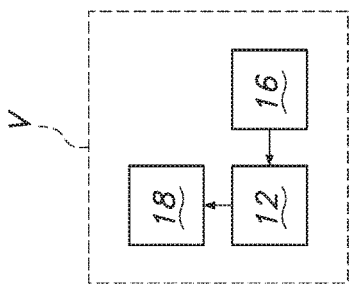
FIG. 7a is a schematic view illustrating an arrangement for actuating the active pillar.

In one orientation of the cam 20, as indicated in FIG. 6, the molding 10 relaxes to assume a first, wind-friendly or noise-reducing configuration. When rotated in either direction, the cam 20 causes the molding 10' to assume a second configuration, better able to channel away moisture. Again, the operation may be repeated as desired or necessary depending on driving conditions or driver preferences. As indicated in FIG. 7a, a sensor 16 as described above may be used to detect ambient conditions and control motor 18 to cause the movement of cam 20 to expose the channel C, and thereby enables or activates the molding 10.

The embodiment of FIGS. 8 and 9 is similar in some respects to the embodiment of FIGS. 3 and 4, in that it includes a flexible actuator 12, such as an inflatable bladder 14. However, in this embodiment, the bladder 14 is arranged for substantially filling a gap or channel C between the molding 10 and windshield W in a first deployed configuration, as indicated in FIG. 9, which would tend to be impervious to moisture and provide a reduction in the amount of wind noise generated. When moisture is present or detected, or a front window is open, the bladder 14' may be deactivated (deflated, as shown in FIG. 8) to assume a second, non-deployed configuration of the molding 10. This exposes the channel C for receiving any moisture and assisting in leading it away from the windshield W, and may also aid in reducing the effects of wind throb. As discussed above, the operation may be repeated as desired or necessary to achieve a particular result in terms of controlling moisture, wind noise, wind throb (when a window is down) or snow buildup. Also, it should be appreciated that the arrangement shown may be modified, such as by tapering the leading faces of the molding 10 or bladder 14, to further help reduce the overall wind noise in any configuration.

Figure 11:
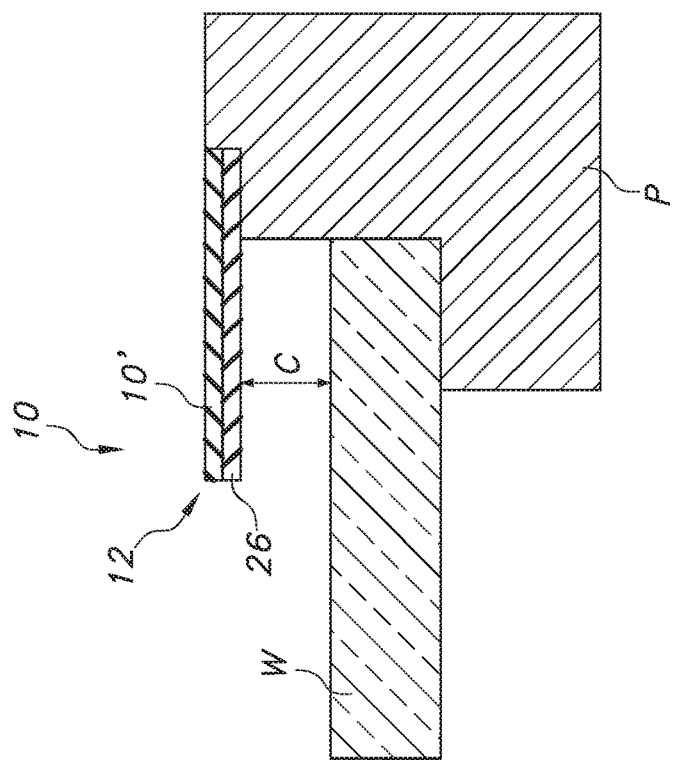
FIGS. 10 and 11 are schematic top down views of an active pillar arrangement in a non-deployed and deployed configuration according to another aspect of the disclosure.
Figure 10:
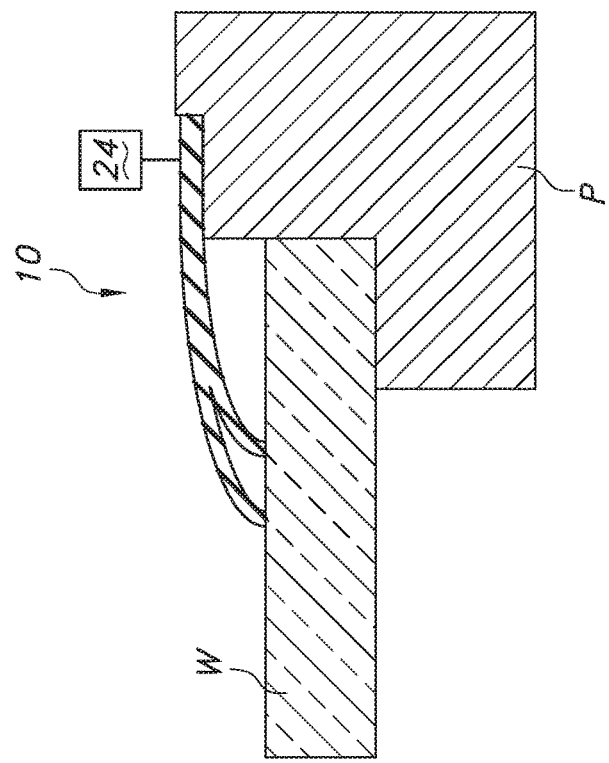

In FIGS. 10 and 11, the molding 10 is associated with or included as part of an actuator 12 that is not only flexible, but capable of assuming different configurations based on a change in applied conditions. For example, the actuator 12 may comprise a bi-metallic strip 26 associated with the molding 10 that changes shape when an electrical current is applied to it (such as from a current source 24). In a relaxed configuration, as shown in FIG. 10, the arrangement is wind-resistant, but when a current is applied, the molding 10 assumes an active configuration to provide a channel C for moisture control and improved wind throb performance when a window is down. Temperature could also be used to change the shape of the strip 26 serving as actuator 12, including by way of using shape memory materials, such as Nitinol.

FIGS. 12 and 13 show that the molding 10 may be configured for actuation in a direction transverse to the plane of the windshield W. Specifically, the actuator 12 moves the molding 10 in the direction of travel T so as to extend beyond and project from an outer surface E or periphery of the pillar P. As can be appreciated, this extension of the molding 10' in this manner helps to prevent moisture on the windshield W from passing over the pillar P, and thus helps to form an extended channel C for channeling the moisture away once collected, and also for aiding in reducing wind throb when a window is open. In the retracted configuration 10 of FIG. 12, the molding 10 is withdrawn to a position substantially flush with the surface of the pillar P. Consequently, the ability of snow to pass over the leading face of the pillar P is enhanced, thus helping to prevent undesirable buildup, and the wind noise may be reduced as a result.

The actuator 12 in this embodiment may be any of the disclosed embodiments discussed above or make take other forms. For example, the actuator 12 may be a spring that may be heated to expand to cause the movement of the molding 10. The actuator 12 could also comprise an expandable material, such as one that increases in size when wet and decreases when dry. An electromagnet and solenoid could also be used to provide the desired actuation. These actuation arrangements may also be used in connection with other disclosed embodiments of the molding 10, or in various combinations, as necessary or desired to achieve a particular implementation.

Figure 15A:
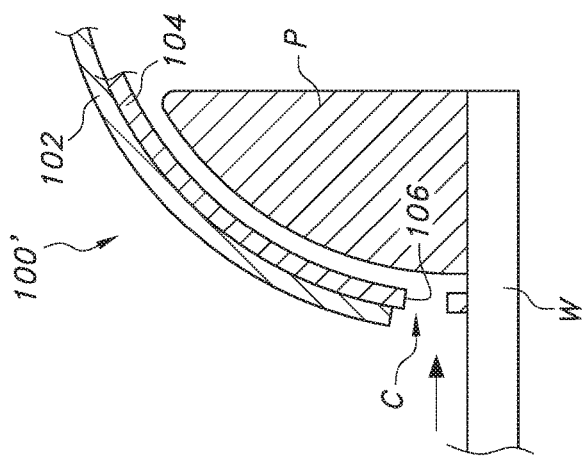
FIGS. 14-14a and 15-15a are schematic front and top down views of an active pillar arrangement in a non-deployed and deployed configuration according to another aspect of the disclosure.
Figure 15:
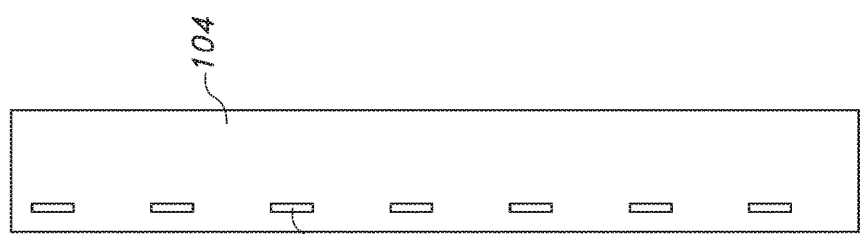
Figure 14A:
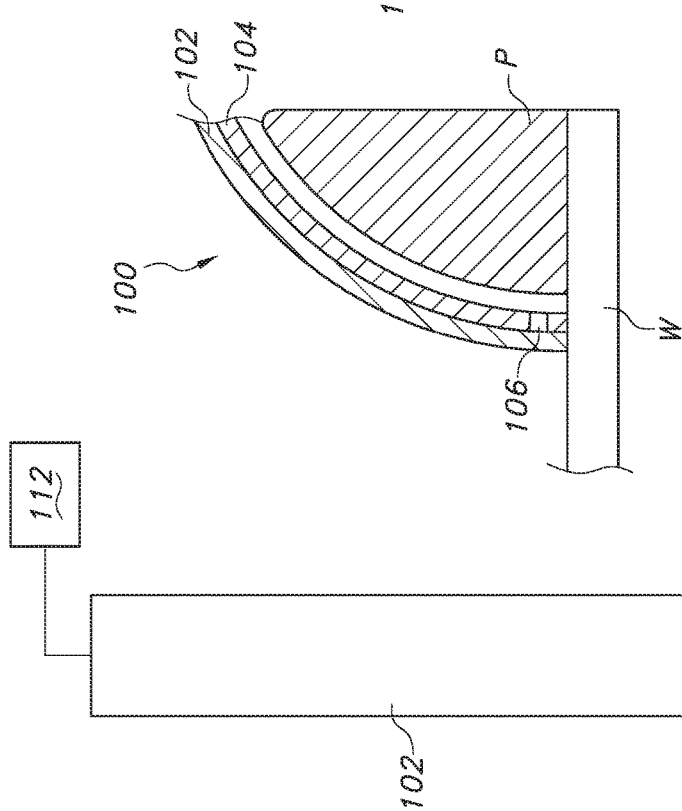
Figure 14:
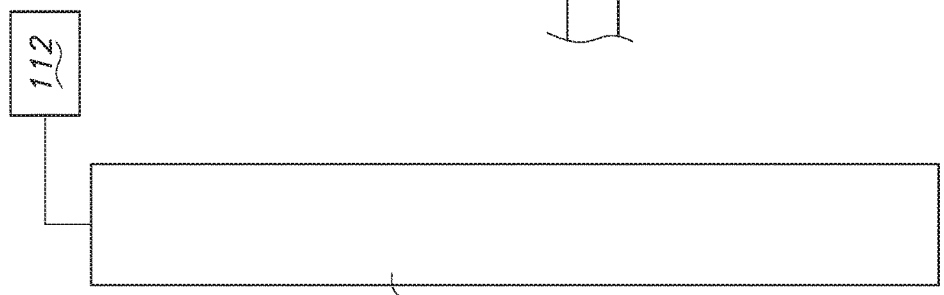

The disclosure may also pertain to the use of a covering or molding in the form of an applique 100, which may be provided along or adjacent to the pillar P, for aiding in providing the active moisture control and reduction in wind noise. In one embodiment, as shown in FIGS. 14 and 15, the applique 100 may comprise first and second portions 102, 104 for at least partially covering the pillar P, at least one of which portions is capable of sliding movement along the other (such as cover portion 102 in FIG. 14a). The inner portion 104 includes one or more openings or passages, which may take the form of slots 106.

As can be appreciated, the relative movement of the portions 102, 104 may be done by an actuator 112, such as a rotary motor. This actuator 112 could be mounted at the top or bottom of the applique 100, or otherwise along it, to cause the relative movement to expose the openings or slots 106. The slots 106 may thus receive fluid and channel it away from the windshield W, such as via an internal channel C (see FIG. 15a and note position of applique 100'). Instead of a rotary actuator, a linear actuator can be used so that the portions 102, 104 slide along each other (such as up or down in a generally vertical direction, but also possibly in a plane generally parallel to the windshield) to expose openings for allowing moisture to reach the channel C if desired, or to block such flow.

Figures 16, 17:
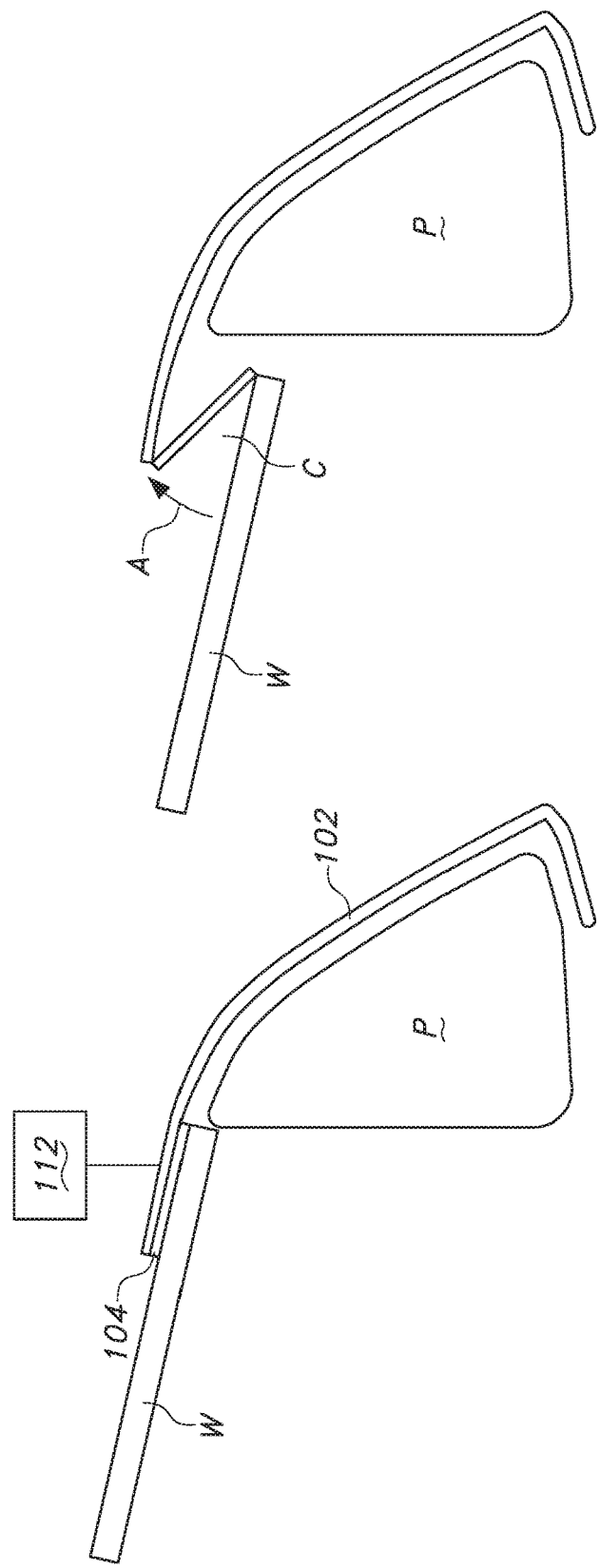
FIGS. 16 and 17 are schematic top down views of an active pillar arrangement in a non-deployed and deployed configuration according to another aspect of the disclosure.

The applique 100 forming the molding 10 may also be provided as two connected components adapted for moving together, such as the result of rotary movement between an active and a collapsed configuration, or by one sliding along the other (or both). Thus, as shown in FIGS. 16 and 17, the applique 100 may comprise a first portion 102 adapted for at least partially covering the pillar P and providing for noise reduction or allowing for snow to pass from the windshield W. A second portion 104 associated with or connected to the first portion 104 may be activated, such as by actuator 112, to cause the first portion 102 to rotate away from the windshield W (note arrow A) and thus form the channel C for receiving moisture on the windshield and assist in guiding it away from the side window (to allow for partial window open without getting wet), and also providing for a reduction in wind throb. The actuator 112 may again may be mounted along the applique 100 to cause the relative movement of either component 102, 104 to activate the changed configuration when desired, or automatically as the result of sensed conditions.

Combined reference is now made to FIGS. 1, 18, and 19 to illustrate a further embodiment of a vehicle pillar arrangement with active moisture control. In this embodiment, the molding 10 is provided with one or more openings for transmitting a flow of air to adjacent the windshield W to assist in moisture control. Specifically, the molding 10 may include an internal passage or channel 10d for transmitting air flow to one or more outlets in the form of nozzles 10e, which may be spaced apart along the molding from adjacent to the hood H to the upper portion of the windshield W.

The nozzles 10e may be oriented for projecting the airflow in a strategic path (such as at an upward angle relative to the longitudinal axis of the molding 10) for directing or guiding fluid, such as moisture, on the windshield W. The guidance is away from the molding 10 and thus also away from pillar P. The exiting airflow, as indicated by flow arrows F, may be transmitted to the channel 10d from a conduit or tunnel L extending along the front portion of the vehicle V in a concealed manner (such as under the hood H or fender R), and may communicate with an inlet I associated with the grill G. The actuator in this case may be a valve (not shown) for controlling the flow through the molding 10, with airflow corresponding to the deployed configuration and no flow corresponding to the non-deployed configuration of the molding 10. As can be appreciated, this arrangement may also work in a passive manner such that airflow is always passing through the molding 10, such that the pillar arrangement remains continuously active as a result.

Additionally, but optionally, the channel or passage 10*d* may extend adjacent or through the pillar P to direct a flow of air to a molding 10 associated with the side of the vehicle, such as along the door D. This channel 10*d* allows airflow, as indicated by arrows F to exit through one or more nozzles 10*f* arranged to direct airflow generally perpendicular to the direction of vehicle travel T. This flow of air may disrupt the flow of fluid, such as wind, parallel to the direction of travel T, and thus help to reduce the incidence of wind throb when only one vehicle window is down (which may be controlled by an associated valve for regulating the airflow in concert with the window opening and closing, or could be continuously active). While a molding 10 in the form of a strip of material is shown, it should be appreciated that the door-side nozzles 10*f* may be positioned in other types of molding, such as the mounting or "sail" associated with a side-mounted rear view mirror.

The active pillar arrangement may take still other forms. For instance, in FIGS. 20 and 21, the molding 10 comprises a projecting portion 10*c* that, in a deployed configuration (10'), is raised to an orientation transverse to the plane of the windshield W. The molding 10 thus projects from the surface or periphery E of the pillar P, and forms the channel C in the desired manner for moisture control. In a non-deployed configuration, as shown in FIG. 21, the projection 10*c* may retract, such as to an orientation in alignment with the plane of the windshield W and substantially flush with the pillar P, thus reducing wind noise and facilitating the passage of snow buildup. The activation may be achieved by rotating the molding 10 (note arrow A), which may be mounted for rotation and actuated by an actuator 12, such as a stepper motor or the like, which again may be positioned at the top or bottom of the molding (FIG. 21*a*).

FIGS. 22 and 23 show that the molding 10 may simply be shaped to facilitate the flow of air over the pillar P in a non-deployed orientation, and then moved to expose a channel C for receiving moisture from the windshield W. The shape of the molding 10 may also be adjusted as desired, such as one having a C-shaped cross-section, as shown in FIGS. 24 and 25, or an irregular solid shape, as shown in FIG. 22 or 23, or any other suitable form. Again, the movement of molding 10 may be controlled by any suitable actuator, such as a rotary motor (see FIG. 21*a*).

FIGS. 26 and 27 show that the molding 10 may be recessed in the pillar P in a first, non-deployed configuration, and may be actuated to project from a surface E of the pillar in an active configuration (10'). This active configuration forms the channel C for carrying moisture away. Actuation in this embodiment may be achieved in any manner described herein, including by the use of inflatable bladders, selectively controlled airflow, a motor, or the like.

As can be appreciated, the activation of the pillar arrangement may be achieved according to a driver setting (that is, whether to be non-deployed or "flush" on the one hand, or deployed on the other), or may be automatically done. As indicated in the table of FIG. 28, the automatic activation may involve the use of a controller 200 for controlling the pillar arrangement, such as by adjusting the position of molding 10, to achieve a desired result based on the conditions present. As indicated, the conditions may include, for example, a determination of ambient temperature, whether the windshield wipers are turned on, whether only one vehicle window as open, when the vehicle is travelling at greater than a particular speed, or any combination thereof. Whether the molding 10 or applique 100 is deployed can then be controlled based on the selected conditions, as indicated, in an effort to provide effective moisture control, while reducing wind noise and also accounting for snow build-up, if present or a concern. Likewise, if deployed automatically and there is a desire to reduce noise, such as for talking or listening in the passenger compartment, then the molding 10 may be adjusted accordingly by overriding the automatic setting. As can be appreciated, the indications in the table of FIG. 28 are provided for purposes of illustration only, and may be varied or changed to achieve a particular outcome, as desired.

The molding 10 may be formed of a flexible, resilient material that can provide a long service life under typical operating conditions for the associated vehicle V. For instance, it may be formed of an elastomer (e.g., rubber). Alternatively, the molding 10 may be formed of composite materials (e.g., metal covered by an elastomer). In the case of the molding in the form of applique 100, it may be fabricate of more rigid materials, such as metals, plastics, or combinations thereof, since flexibility may be less important.

In summary, numerous benefits are provided by the active pillar arrangement according to the various aspects of the disclosure. The molding 10 or applique 100 may be caused to assume deployed and non-deployed (flush) states, as desired to provide for moisture control if desired, or to reduce the wind noise, snow buildup, or effects of wind throb. Various forms of actuators 12 are described, including inflatable bladders 14, a bi-metallic strip 26, and even a valve for controlling a flow of air to the molding 10, but as noted may take any suitable form to achieve the desired active control. The arrangement may also be subject to automatic or manual deployment to suit the needs or desires of the vehicle operator.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An apparatus for use in connection with a pillar for supporting a vehicle windshield, comprising:
   a molding for positioning adjacent the pillar, the molding having an upper surface, a lateral side, and a passage for receiving an airflow, the passage extending laterally through the molding and communicating with one or more outlets in the lateral side of the molding for transmitting the airflow in a direction for directing fluid away from the molding.

2. The apparatus of claim 1, wherein the one or more outlets are oriented for directing the airflow away from the pillar.

3. The apparatus of claim 1, wherein the one or more outlets are oriented for directing the airflow in a vertical direction.

4. The apparatus of claim 1, wherein the one or more outlets are oriented for directing airflow transverse to a direction of vehicle travel.

5. The apparatus of claim 1, wherein at least one first outlet is oriented in a first direction for directing the airflow toward the windshield of the vehicle to keep moisture away from the pillar, and at least one second outlet is oriented in a second direction opposite the first direction for directing airflow transverse to a direction of vehicle travel.

6. The apparatus of claim 1, further including an actuator for controlling the airflow to the passage.

7. A vehicle including the apparatus of claim 1.

8. The vehicle of claim 7, wherein the one or more outlets are on a lateral side of the vehicle.

9. The vehicle of claim 7, further including a conduit for transmitting the airflow from a grill of the vehicle to the passage.

10. An apparatus for use in connection with a vehicle windshield, comprising:
   a pillar for supporting the windshield, the pillar including a surface exposed to wind during the movement of the vehicle; and
   a molding for positioning adjacent the pillar, the molding having an upper surface, a lateral side, and a passage for receiving an airflow, the passage extending laterally through the molding and communicating with one or more outlets in the lateral side of the molding for transmitting the airflow in a direction for directing fluid away from the molding.

11. The vehicle of claim 7, wherein the molding is located above the vehicle windshield, and the one or more outlets are arranged for directing fluid along a surface of the windshield.

12. The vehicle of claim 7, wherein the molding is located above the vehicle windshield, and the one or more outlets are arranged for directing fluid outwardly from a side of the vehicle.

\* \* \* \* \*